INVENTOR.
Dan R. Kimberlin
BY
a. M. Heiter
ATTORNEY

Sept. 8, 1970     D. R. KIMBERLIN     3,527,116

TRANSMISSION CONTROL

Filed Dec. 12, 1968     2 Sheets-Sheet 2

INVENTOR.
Dan R. Kimberlin
BY
A. M. Heiter
ATTORNEY

United States Patent Office 3,527,116
Patented Sept. 8, 1970

3,527,116
TRANSMISSION CONTROL
Dan R. Kimberlin, Saginaw, Mich., assignor to General Motors Corporation, Detroit, Mich., a corporation of Delaware
Filed Dec. 12, 1968, Ser. No. 783,362
Int. Cl. G05g 9/18
U.S. Cl. 74—484                    10 Claims

ABSTRACT OF THE DISCLOSURE

The transmission control assembly shown embodies a shift lever and an electrically operated cross-shift mechanism including a solenoid which is energized by a switch actuated by axial pivotal movement of the H-type manual shift lever in the neutral portion thereof from the second-third shift position to the first-reverse shift position. The switch is located in the upper steering column housing, and the solenoid is mounted on a cover plate of the transmission housing. When the solenoid is in its deenergized position, a first pin mounted on a selector lever which is movable with the solenoid core, is in contact with a second-third shift lever which is operatively connected to second and third gears. Energization of the solenoid causes a second pin on the selector lever to move in a direction away from the second-third lever and then into contact with the first-reverse lever which is operatively connected to first and reverse gears. After opening or closing the switch by axial pivotal movement of the manual lever and thereby selecting a particular lever, subsequent rotary movement of the manual lever along the second-third or first-reverse legs, respectively, of the H shift will complete the engagement of the appropriate transmission gearing.

---

This invention relates generally to transmissions and more particularly to manually-actuated electromechanical control therefor.

While mechanically-operated transmission control linkages have been prominent in the past, it is desirable to incorporate electrically-operated control linkages in today's automobiles in order to standardize on steering column design, thereby producing more economical steering columns. In other words, the electrically-operated, single shift lever control linkage permits the use of a standard automatic transmission steering column in a vehicle having a manual transmission, in lieu of a different synchromesh steering column and provides a highly efficient shifting mechanism.

Accordingly, a primary object of the invention is to provide a solenoid-operated control linkage for a vehicular transmission.

Another object of the invention is to provide a control linkage which includes an electrically-operated cross-shift or selector mechanism to select between the first-reverse and second-third shift mechanism in response to manual selecting movement of the manual shift lever and a single lever control to operate the selected shift mechanism in response to shifting movement of the manual shift lever.

A further object of the invention is to provide a control linkage which includes a single shift lever and an electrically-operated cross-shift or selective mechanism operative in conjunction with an interlock linkage arranged to engage first or reverse gears while maintaining second and third gear levers thereof in a neutral position, and vice versa.

Still another object of the invention is to provide an improved electrically-operated control linkage wherein the solenoid and cross-shift mechanism thereof are mounted in a housing or cap on a cover plate of the transmission.

Figure 1:
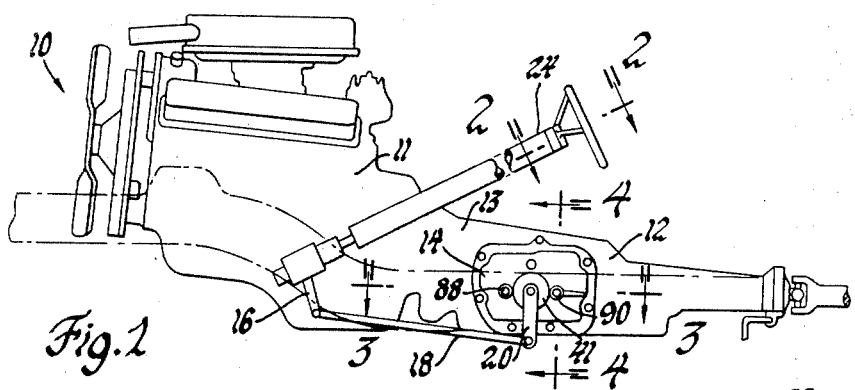
Figure 2:
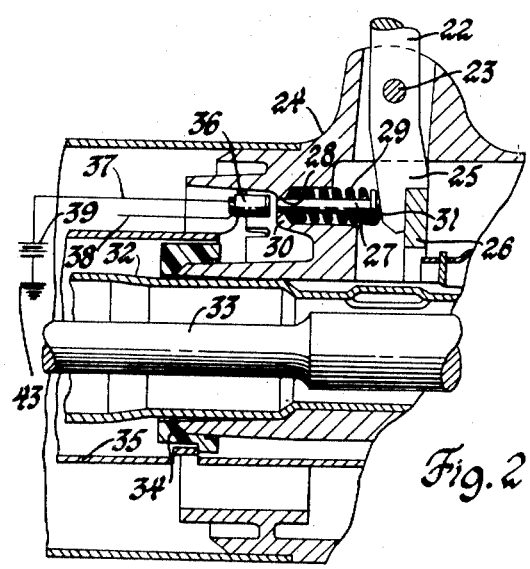
Figure 3:
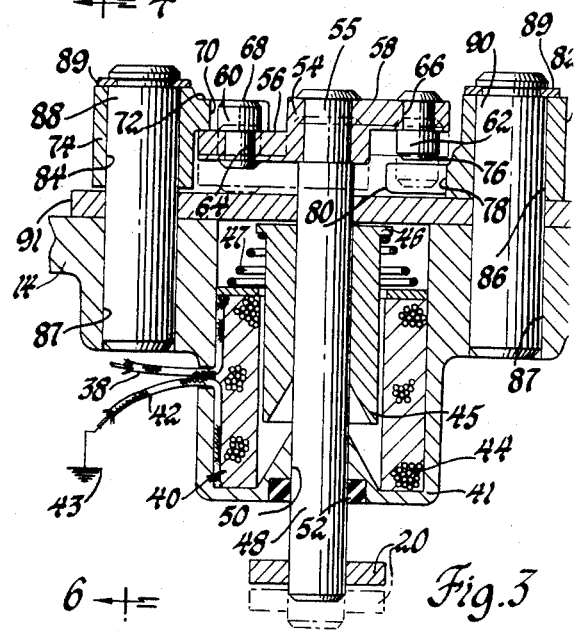
Figure 4:
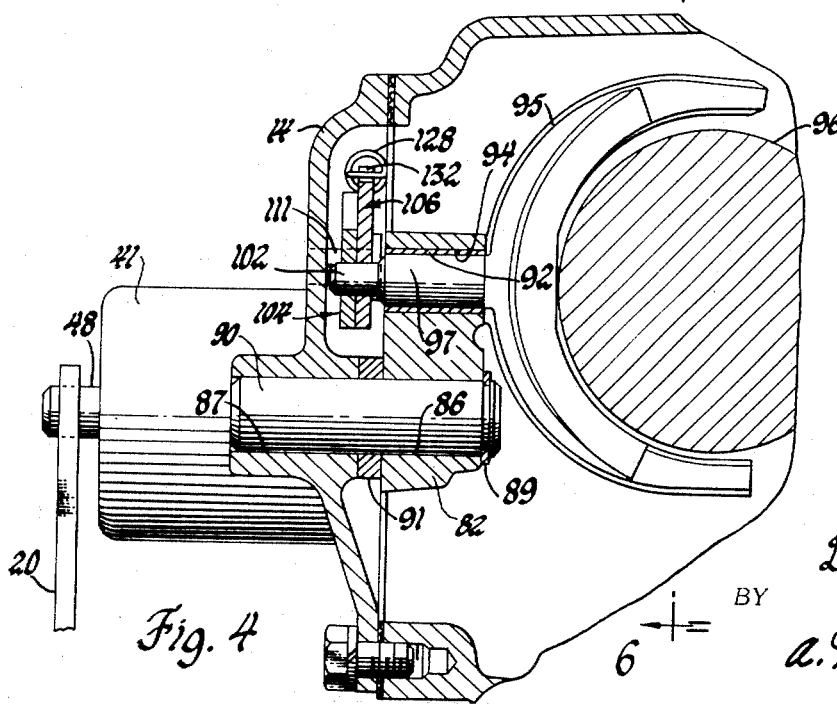
Figure 6:
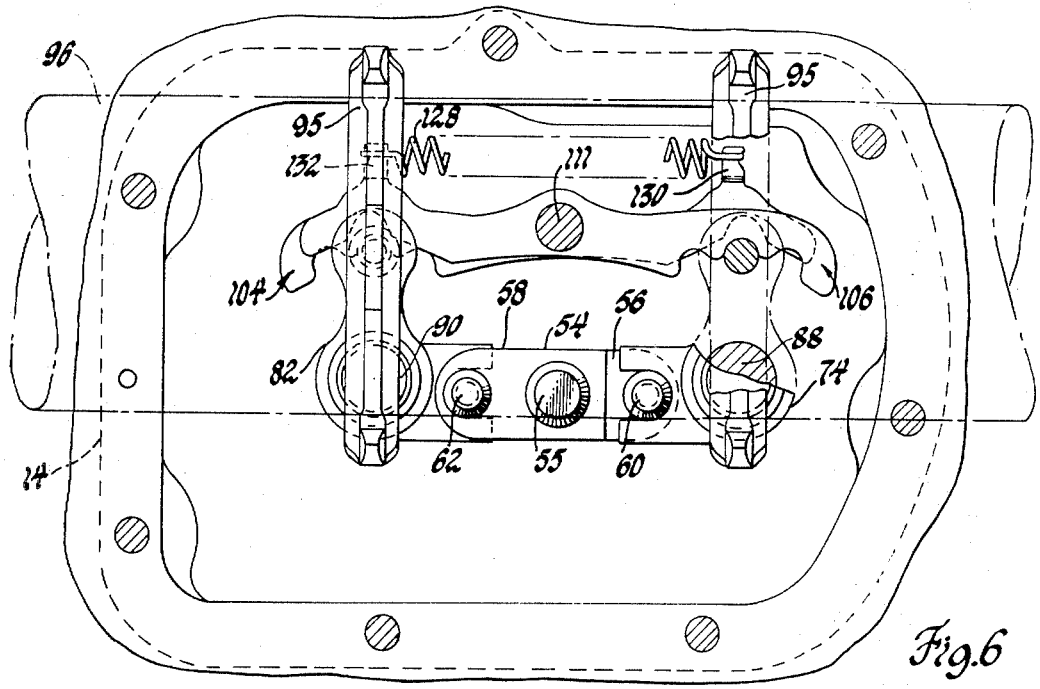
Figure 7:
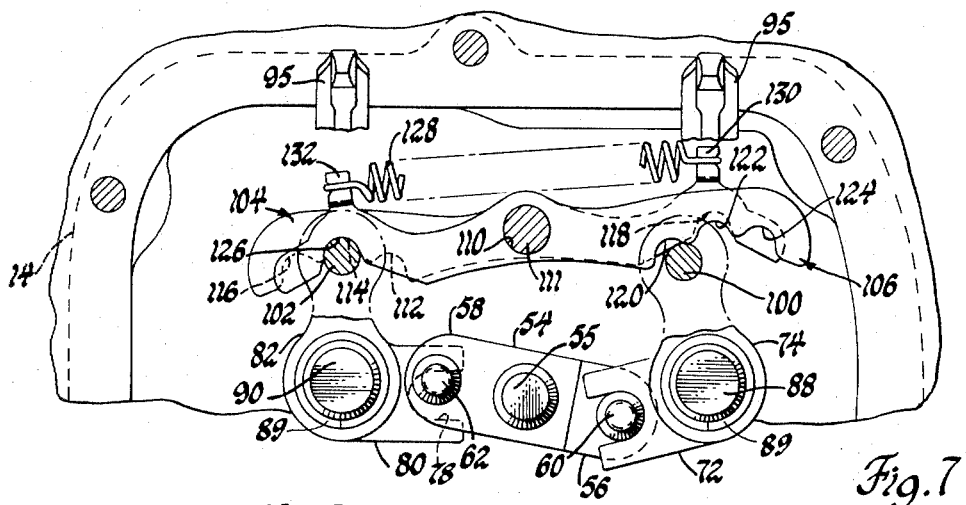
Figure 5:
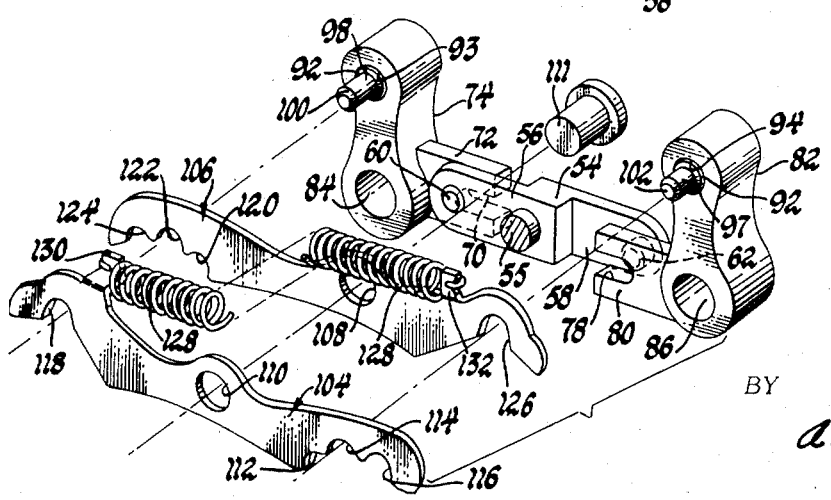

Other objects and advantages will become more apparent when reference is made to the following description and accompanying drawings wherein:

FIG. 1 is an elevational view of a transmission embodying the invention;
FIG. 2 is a fragmentary cross-sectional view of the upper portion of a steering column embodying the invention;
FIG. 3 is an enlarged cross-sectional view of a portion of FIG. 1;
FIG. 4 is an enlarged fragmentary cross-sectional view of a portion of FIG. 1;
FIG. 5 is a partial exploded view of the interlock linkage;
FIG. 6 is a cross-sectional view taken along the plane of line 6—6 of FIG. 4, and looking in the direction of the arrows; and
FIG. 7 is a fragmentary view similar to FIG. 6, but showing the interlock linkage in a ratio position.

Referring now to the drawings in greater detail, FIG. 1 illustrates a vehicular power train 10 including an engine 11 and a manual transmission, such as a three-speed and reverse transmission 12, the latter having a housing 13 and a cover plate 14. A transmission control lever 16 is connected via a rod 18 to a shift lever 20 which is pivotable in a clockwise direction in FIG. 1 for actuation of either the first or third drive gears (not shown) of the transmission 12, and pivotable in a counterclockwise direction in the drawing for actuation of either reverse or second gears (not shown), depending upon the axial position of the shift lever 20, as will be explained.

As seen in FIG. 2, the inboard end of the manual selector lever 22 is pivotably mounted on a pin 23 in the upper column rotary housing 24. The inboard end portion 25 of the selector lever 22 is urged into the 2-3 shift position against a stop 26 by a spring-loaded flanged pin 27 slidably mounted in an opening 28. The spring 29, mounted between an abutment 30 and the flange 31, biases the pin 27 into contact with the end portion 25 of the selector lever 22 at all times.

The rotary housing 24 is rotated by the selector lever 22, causing the control tube 32 to rotate around the steering shaft 33 in a bearing member 34 located between the steering column 35 and the control tube 32.

A switch 36 is mounted in the upper column rotary housing 24 adjacent the left end (FIG. 2) of the pin 27. Wire leads 37 and 38 lead from the switch 36 to a battery, represented at 39, and a solenoid 40 (FIG. 3), respectively. The solenoid 40 is mounted in a solenoid housing 41 on the transmission cover plate 14. A wire lead 42 leads from the solenoid 40 to ground, represented generally at 43.

The solenoid 40 includes the usual windings 44 and a core 45 having a flange 46 formed on one end thereof, the core 45 being mounted concentrically within the windings 44. A spring 47, mounted between one end of the windings 44 and the flange 46, biases the core 45 in a direction away from the windings 44. The solenoid core 45 is fixed on a shaft 48 which extends through the center of the core 45 and out of an opening 50 formed in the solenoid housing 41. A suitable seal 52 is mounted around the shaft 48 in the opening 50. The shift lever 20 is secured to the shaft 48 adjacent the outermost end thereof. A shift drive bar 54 is fixedly secured on the inboard end 55 of the shaft 48. The drive bar 54 includes parallel and oppositely extending leg portions 56 and 58. Drive pins 60 and 62 are mounted in openings 64 and 66 formed near the ends of the legs 56 and 58, respectively. An extended end 68 of the pin 60 at times enters a notch 70 in a lug 72 formed on a second-third selector lever 74, while an extended end 76 of the pin 62 at times enters a notch 78 in a lug 80 formed on a reverse-first selector lever 82.

The selector levers 74 and 82 include center openings 84 and 86, respectively, formed in one end thereof. Shafts 88 and 90 are rotatably mounted through the openings 84 and 86, respectively, and held therein by retaining rings 89. The shafts 88 and 90 extend through a member 91 and are press-fitted in openings 87 formed in the cover plate 14. Openings 93 and 94, including bearing surfaces 92, are formed in the other end of each of the selector levers 74 and 82, parallel to the openings 84 and 86, respectively. Shift forks 95 (FIGS. 4 and 5) extend from trunnions 97 and 98, which are rotatably mounted in the bearings 92, and engage shift collars 96 in a conventional manner, such as described in the Fodrea Pat. No. 3,088,-336. A pair of locking pins 100 and 102 extend from the ends of the trunnions 97 and 98 opposite the shift forks 95.

A pair of identical interlock levers 104 and 106 (FIGS. 5–7) are pivotally mounted via central openings 108 and 110, respectively, on a pivot pin 111 which is secured to the solenoid housing 41 (FIG. 4). The lever 104 is positioned on the pin 111 such that three recesses 112, 114 and 116 are formed in the right-hand end thereof (FIG. 5), and a single recess 118 is formed in the left-hand end thereof. The other interlock lever 106 has its position on the pin 111 reversed, such that three recesses 120, 122 and 124 are formed in the left end thereof (FIG. 5), while its single recess 126 is formed in the right end thereof. A coil spring 128 is extended and mounted at its ends on anchor tabs 130 and 132 formed on the interlock levers 104 and 106, respectively, the tabs 130 and 132 being formed on the single recessed ends of the levers opposite the single recess edges thereof. The spring 128, being under tension, urges the interlock lever 104 in a clockwise direction about the pivot pin 111, and the other interlock lever 106 in a counterclockwise direction about the pin 111, the result being that each of the interlock levers 104 and 106 has its respective central or neutral recess 114 and 122 of the two sets of three recesses urged into contact with its respective locking pin 102 or 100, while each of the single recesses 118 and 126 is held avove its associated locking pin 100 and 102, respectively.

OPERATION

The manual selector lever 22 is illustrated in FIG. 2 in the neutral position. Relative to the well-known H shift movement, the lever 22 is shown in neutral at the right-hand end of the cross portion of the H, intermediate the second and third gear legs thereof. In this position the solenoid 40 is deenergized and the shift lever 20, FIG. 3, is in position A.

Assume now that the operator has started his vehicle engine and wishes to shift into "low" or first gear. He will move the selector lever 22 across the neutral or center portion of the H to the left. This will cause the inboard end 25 of the lever 22 to move the pin 27 to the left in FIG. 2, against the force of the spring 29, moving it into contact with the switch 36, causing the latter to close just before the lever 22 reaches the left-hand end of the cross portion of the H, intermediate the reverse and first gear legs thereof.

Closing the switch 36 will energize the solenoid 40 via the wire lead 38 connected between the switch 36 and the windings 44, and cause the solenoid core 45 to be pulled downwardly in FIG. 3, against the force of the spring 47, moving the shift lever 20 to position B. This moves the drive bar 54 downwardly and pulls the end 68 of the pin 60 out of the notch 70 of the selector lever 74 and projects the end 76 of the other pin 62 into the notch 78 of the selector lever 82. At this point, the locking pin 102 is positioned in the central recess 114 of the interlock lever 104, while the locking pin 100 is positioned in the central recess 122 of the interlock lever 106.

Assume that the operator shifts into low or first gear, i.e., into the lower left leg of the H. Rotation of the manual selector lever 22 in this manner will rotate the housing 24 in a direction which will cause the shift lever 20 to rotate to the left or clockwise in FIG. 1 via the control tube 32, the lever 16 and the linkage rod 18. This will rotate the shift drive bar 54 (FIG. 5) in a clockwise direction and cause the lug 80 and its associated reverse-first selector lever 82 to rotate in a counterclockwise direction, moving the pin 102 from the central recess 114 to the adjacent left recess 112 of the interlock lever 104. As the pin 102 passes under the lobe between recesses 114 and 112, the single recess 118 on the other end of the lever 104 is rotated downwardly into engagement with the pin 100, assuring that the second-third selector lever 74 remains in the neutral position.

Shifting into reverse, or into the upper left leg of the H, would result in an opposite rotation of the housing 24, FIG. 2, but with the pin 27 (FIG. 2) still in contact with the switch 36, resulting in clockwise rotation (FIG. 5) of the lug 80 and selector lever 82, via the control tube 32, the lever 16 and the linkage rod 18, and the pin 102 would enter the recess 116.

Obviously, once the selector lever 22 is manually shifted to the right across the center portion of the H, the inboard end 25 thereof will pivot about the pin 23 to the right in FIG. 2, allowing the spring 29 to bias the pin 27 to the right away from the switch 36. Opening the switch 36 in this manner will once again deenergize the solenoid 40, permitting the spring 47 to snap the core 45 and the associated shaft 48 upwardly in FIG. 3, moving the end 76 of the pin 62 out of the notch 78 and the end 68 of the pin 60 into the notch 70.

In its retracted position, counterclockwise rotation of the manual selector lever 22 and the control tube 32 results in rotation of the drive bar 54 in a counterclockwise direction (FIG. 5), causing the lug 72 and the selector lever 74 to rotate in a clockwise direction. This moves the locking pin 100 into the second gear recess 120 (FIG. 5) of the interlock lever 106 in the same manner as was explained above relative to the other interlock lever 104. It is apparent that the opposite rotational movement, while the solenoid 40 remains deenergized, would result in the locking pin 100 entering the third gear recess 124.

In each of the four interlock recess positions, i.e. reverse 116, first 112, second 120 and third 124, one or the other of the shift forks 95, rotatably extending from the trunnions 97 or 98, actuates the associated shift collar 96 which, in turn, engages the proper gearing, as described in the above-mentioned Fodrea Pat. No. 3,088,336.

It should be apparent that the invention provides a manually-actuated, electromechanical control linkage which may be used in lieu of the more complicated mechanically-operated transmission controls and which is highly efficient and fast to respond to manual actuation thereof.

It should also be apparent that only one shift lever and one linkage rod need be employed in place of those mechanical systems which require two such shift levers and associated linkage rods.

While only one embodiment of the invention has been disclosed and described, it is apparent that other modifications thereof are possible.

I claim:

1. A control mechanism for a transmission, said mechanism comprising a housing rotatably mounted on a steering column, a manual selector lever pivotably mounted on said rotary housing and pivotable between two operative positions thereon, biasing means in said rotary housing for urging said selector lever into one of said two operative positions, said housing being rotatable by rotary movement of said selector lever when said selector lever is in either of said two operative positions, a shift lever rotatably mounted on said transmission and having two distinct axial positions thereon, linkage means operatively connecting said manual selector lever and said shift lever, a switch operable by said pivotable movement of said selector lever against the force of said biasing means, a solenoid operably connected to said switch and to said shift lever for causing axial movement of said shift lever from the first of said two axial positions to the second of said positions upon energization by said switch and for causing axial movement from said second axial position to said first of said two axial positions upon deenergization by said switch, said shift lever being rotatable in said first of said two distinct axial positions upon rotary movement of said manual selector lever while said selector lever is in one of said two operative positions and rotatable in said second axial position upon rotary movement of said manual selector lever while said selector lever is in the other of said two operative positions.

2. A control mechanism for a three-speed transmission having gears producing four gear ratios, said mechanism comprising a manual selector lever having four distinct positions for selecting said four gear ratios and a neutral range associated therewith, a shift lever rotatably and slidably mounted on said transmission and movable between two distinct axial positions thereon and between two distinct rotary positions in each of said two distinct axial positions, means connected to said shift lever and operable in said four rotary positions for coordinating said four gear ratios, mechanical means operatively connecting said manual selector lever to said shift lever for moving said shift lever into said four rotary positions in response to manual rotary movement of said manual selector lever into said four distinct positions, and electrical means operatively connecting said manual selector lever to said shift lever for moving said shift lever from one axial position to the other in response to manual movement of said manual selector lever through said neutral range.

3. The mechanism described in claim 2, wherein said mechanical means includes a control tube operatively connected to said manual selector lever and rotatable in response to rotation of said manual selector lever, and linkage means operatively connected between said control tube and said shift lever for rotating said shift lever in response to rotation of said control tube.

4. The mechanism described in claim 2, wherein said first-mentioned means includes a shaft secured to said shift lever for axial and rotary movement therewith, said shaft being adapted to be selectively operatively connected to said gears, and said electrical means includes a switch operable by said manual selector lever, a solenoid electrically connected to said switch and having the core thereof fixedly secured to said shaft for axially moving said shaft in response to actuation of said switch by movement of said manual selector lever.

5. The mechanism described in claim 2, and interlock means operatively connected to said shift lever and operable in response to rotary movement of said shift lever to hold the reverse and first gears of said gears in neutral position while one of the second and third gears of said four gears is engaged and the shift lever is in one of said two distinct axial positions, and operable in response to rotary movement of said shift lever to hold said second and third gears in neutral position while one of said reverse and first gears is engaged and the shift lever is in the other of said two distinct axial positions.

6. A control mechanism for a vehicular transmission, said mechanism comprising a manual selector lever mounted on a steering column for rotary and axial movement thereon, an electrical switch actuated by axial movement of said manual lever, a control tube mounted on said steering column and operatively connected to said manual selector lever for rotary movement therewith, a shaft mounted on said transmission for axial and rotary movement thereon and adapted to be selectively operatively connected to the reverse, first, second and third gears therein, a shift lever mounted on said shaft for axial and rotary movement therewith, said shift lever and said shaft having two distinct axial positions and two distinct rotary positions in each of said two distinct axial positions, a solenoid mounted on said transmission, said shaft being secured to the core thereof and movable axially between said two distinct axial positions in response to axial movements of said core, said solenoid being energized and deenergized by said switch, linkage means operatively connected between said control tube and said shift lever for moving said shift lever and said shaft into said four rotary positions in response to corresponding rotary movements of said manual lever.

7. The control mechanism described in claim 6 and interlock means operatively connected to said shaft for retaining two of said reverse, first, second and third gears in a neutral position while one of said other two of said gears is actuated by rotary movement of said shaft.

8. The control mechanism described in claim 7, wherein said interlock means includes a shift drive bar fixedly secured to said shaft, said drive bar having spaced apart and oppositely extending legs formed thereon, a pin mounted on each of said legs, said pins extending from said legs in opposite directions, second and third shafts mounted parallel to one another on said transmission, a selector lever rotatably mounted on each of said second and third shafts, a pin mounted on each of said selector levers, said pins extending from said selector levers in the same direction, a pair of interlock levers pivotably mounted in juxtaposition on said transmission adjacent said last-mentioned pins, each of said interlock levers having three recesses formed adjacent one end thereof and a single recess formed adjacent the other end thereof, the single recess end of one of said interlock levers being positioned adjacent the three recess end of the other of said interlock levers, spring means for urging the single recess on one end of one of said interlock levers into contact with said pin on one of said selector levers when said pin on said other of said selector levers is moved from one of said three recesses on the other end of said interlock lever to another of said three recesses, thereby selecting a desired one of two transmission gea ratios while retaining the other two transmission gears in a neutral position.

9. A solenoid actuating mechanism for a manual transmission having four gear ratios, said mechanism comprising a housing, a solenoid having windings fixedly secured in said housing, means operatively connected to said solenoid for energizing and deenergizing said solenoid, a shaft concentrically located and slidably and rotatably mounted within said windings and having one end thereof extending from said housing away from said transmission, said shaft being slidably movable between two distinct axial positions and rotatably movable between two distinct radial positions in each of said axial positions, each of said four radial positions serving to actuate one of said four gear ratios, means formed on said extended end for rotating said shaft, said solenoid having a core fixedly secured to said shaft and concentrically mounted within said windings, a flange formed on said core on the end thereof furthest away from said extended end of said shaft, a spring mounted between said flange and an end face of said windings for urging said core from one of said two axial positions to the other upon deenergization of said solenoid, said core being slidably movable to said other axial position upon energization of said solenoid, and means formed on the other end of said shaft opposite said extended end thereof and adapted to be operatively connected to said transmission for selecting one of two of said four gear ratios in each of said two axial positions upon rotary movement of said shaft.

10. The mechanism described in claim 9, wherein said last-mentioned means includes a shift bar having spaced apart and oppositely extending legs formed thereon, a pin mounted on each of said legs, said pins extending from said legs in opposite directions, second and third shafts mounted parallel to one another on said transmission, a selector lever rotatably mounted on each of said second and third shafts and alternately operatively connected to said pins, depending upon the axial position of said first-mentioned shaft, a trunnion fixedly secured to each of said selector levers, and a shift fork fixedly secured to each of said trunnions for selecting one of two of said four gear ratios in each of said two axial positions of said first-mentioned shaft upon rotary movement of said first-mentioned shaft.

References Cited

UNITED STATES PATENTS 2,306,644 12/1942 Sewell _____ 74—473
2,457,876 1/1949 Derungs _____ 74—335 X MILTON KAUFMAN, Primary Examiner U.S. Cl. X.R.

74—335, 473, 477